Oct. 5, 1965      F. P. RICHTER      3,210,432
THERMAL HYDROGENOLYSIS OF POLYPHENYLS
Filed Nov. 6, 1961
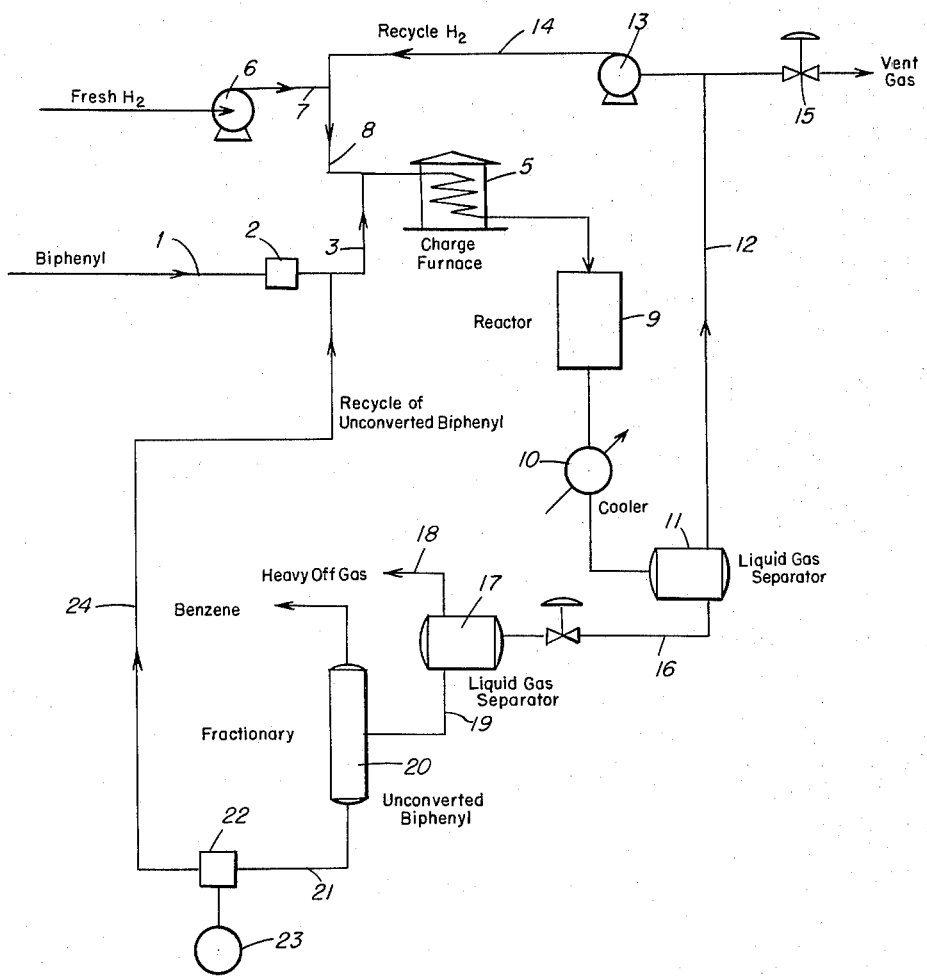
INVENTOR.
Frederick P. Richter
BY Hastings S. Trigg
Attorney

United States Patent Office 3,210,432
Patented Oct. 5, 1965

3,210,432
THERMAL HYDROGENOLYSIS OF POLYPHENYLS
Frederick P. Richter, Darien, Conn., assignor to Socony
 Mobil Oil Company, Inc., a corporation of New York
Filed Nov. 6, 1961, Ser. No. 150,336
3 Claims. (Cl. 260—668)

The present invention is concerned with the thermal hydrogenolysis of polyphenyls, in general, and biphenyl, in particular, to lower polyphenyls or benzene. The invention more specifically relates to a novel method for non-catalytic transformation of biphenyl to benzene, in the presence of hydrogen.

In the thermal hydrodealkylation of toluene to benzene, a minor portion of the reaction product obtained is biphenyl. At present these biphenyls are discarded for lack of a practical and economical method for their conversion to a useful hydrocarbon, such as benzene. In addition, polyphenyls, such as biphenyl and terphenyl, are presently employed as organic coolants for nuclear reactors because of their resistance to radiation and thermal stability. Nevertheless, even these polyphenyls, at the continued elevated temperatures of reactor operation and radiation exposure, slowly combine to form larger polyphenyls. These larger molecular aggregates will increase the viscosity of the coolant and eventually impair the efficiency of the cooling system. For this reason, these highly complexed polyphenyls are removed and discarded. In still other reactions, such as the oxidation of benzene to phenol, products such as biphenyl are produced as by-products. Because the uses of biphenyl are limited, it usually has only fuel value when produced as a byproduct of such processes. Until the present invention, no means of ready and economical conversion of these to benzene has been available to the art.

It has now been found, however, that polyphenyls, particularly biphenyl, can be quickly, efficiently, and economically converted into useful chemicals, chiefly benzene, by thermal hydrogenolysis of polyphenyls. As a result of such thermal hydrogenolysis of polyphenyls, it has been found possible to obtain yields of benzene which evidence a percent conversion of polyphenyls on the order of 94 weight percent or more. The efficiency of the reaction is indicated by the further fact that the selectivity for benzene is in excess of 90 weight precent and frequently may run as high as 98 percent depending on the particular details of the operation of the process.

It is therefore a general object of this invention to provide a novel method for conversion of polyphenyls, including biphenyl, into useful commercial chemicals. It is a specific object to provide a novel process for the thermal hydrogenolysis of by-product biphenyl into additional benzene. It is a still further specific object to provide a method for recovery of biphenyl and benzene from more complex polyphenyl reactor coolant fluids. Other objects and advantages of this invention will become apparent to those skilled in the art from the following detailed description, considered in conjunction with the figure, which presents a flow diagram of a method of carrying out the process of this invention.

In general this invention provides a non-catalytic process for converting polyphenyls into benzene, which comprises charging said polyphenyl and hydrogen to a pressurized reaction zone, at a temperature above 1000° F., a pressure in excess of 100 p.s.i.g., a residence time of about 5–50 seconds, and a hydrogen to hydrocarbon mole ratio of 2–30:1 at the inlet to the reactor.

The general reaction may be illustrated by reference to the thermal hydrogenolysis of biphenyl to benzene by the following reaction scheme:

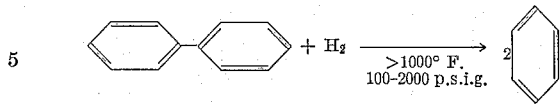

In the above reaction one mole of biphenyl would react with one mole of hydrogen to produce 2 moles of benzene under the conditions herein specified.

While the general reaction involves non-catalytic thermal cracking of the polyphenyl starting material in the presence of hydrogen at temperatures in excess of 1000° F., it is preferred that the process be operated at temperatures extending from 1200 to 1400° F. wherein the maximum conversion has been found to occur. Of course, the temperature will be affected by the contact time and pressure in the system and can vary as the specific operating conditions and available equipment dictates.

Moreover, while the pressure in the system is broadly stated to be in excess of 100 p.s.i.g. and generally less than 2000 p.s.i.g., the preferred range is 300-800 p.s.i.g. for most reactions. This variable also can be affected by the type of equipment employed, the temperature, and the residence time in the reaction zone. The residence time is broadly 5–50 seconds in the reaction zone, under the specified ranges of temperature and pressure, but particularly good yields of benzene have been obtained using a residence time in the reaction zone of from 10–30 seconds.

The invention may be further illustrated by reference to the figure which gives a brief flow diagram of the process.

Referring to the drawing and relating it to a process for conversion of biphenyl of benzene, it will be noted that molten biphenyl is introduced through a pipe 1 from where it is pumped by a pump 2 to a charge furnace 5. In the furnace 5, the molten biphenyl is heated to a temperature of 1200–1350° F. by conventional means, such as by any well known indirect heat exchange unit. Entering this charge furnace also is a stream of hydrogen under the impetus of a pump 6 via lines 7, 8, and 4. When the reactants, hydrogen and biphenyl, have both been heated to temperatures of the order of 1200–1350° F. in charge furnace 5, they are immediately introduced into a reactor 9 to contact each other for about 10–30 seconds at pressures in excess of 300 p.s.i.g. and preferably less than 800 p.s.i.g., thereby effecting hydrogenolysis of the biphenyl to benzene.

At the termination of the thermal hydrogenolysis of the biphenyl in the reactor, the reaction products are rapidly conducted from the reactor to a cooler 10 which is generally an indirect heat exchange unit of conventional design. In the cooler 10 the products are reduced to room temperature and then are conducted to a liquid-gas separator 11 of conventional design, where the unreacted hydrogen is separated from the mixture of unconverted biphenyl, heavy off gas, and benzene effluent, from the reactor 9. The hydrogen gas is removed from the separator 11 through a line 12. It can be recycled to the reactor by pumping it with a pump 13 through a line 14, and admixed with makeup hydrogen from line 7. If it is desired a portion of the recycle hydrogen can be removed from the reaction system through a relief valve 15.

The mixture of heavy off-gas, biphenyl, and benzene is led off through a line 16 to a second liquid-gas separator 17. In the liquid-gas separator 17 the heavy off-gas is removed and discarded through a line 18. The remaining mixture of benzene and liquid unconverted biphenyl is introduced through line 19 into distillation tower 20, or other suitable fractionator, where the benzene is distilled off for storage while the remaining unconverted biphenyl is removed from the bottom of the tower and conducted through a line 21 to a pump 22 having a surge tank 23. Then, the unconverted biphenyl is conducted through a recycle line 24 back into the system through the line 3 from pump 2 which carries it into the charge furnace for another pass through the system.

Although the above flow sheet describes the treatment of molten biphenyl which has been heated prior to being contacted with the hydrogen reactant, as biphenyl is normally a solid at room temperature, it is an alternative mode of our operation to introduce the biphenyl reactant in a liquid organic solvent such as toluene, xylene or other suitable solvent for biphenyl. In this event the organic solvent, which normally has a lower boiling point than the biphenyl, and a higher one than benzene will be stripped off in the distillation column 20 after the benzene component has been removed.

Commercially the proposed process could be carried out using biphenyl alone plus hydrogen, or the biphenyl can be charged in solution with the solvent; the specific economics of the process determining which method will be used. If, for example, a toluene thermal hydrodealkylation unit is available with excess capacity, the biphenyl can be charged to the hydrodealkylation reactor in solution with the toluene to be dealkylated. The dealkylation of toluene and hydrogenolysis of biphenyl would then take place simultaneously in the same unit. Conditions within the aforedescribed ranges can be selected to favor optimum production of benzene. This method of operation can be used in conjunction with demethylating other alkylaromatic hydrocarbons, such as xylene, trimethylbenzene, methylnaphthalene, and the like.

To further specifically illustrate the operation of the process of this invention, the following specific examples are set forth. These examples are given by way of illustration only and may not be construed to limit the scope of the inventive concept disclosed.

*Example 1*

One thousand grams of molten biphenyl was pumped from a charge furnace, where it had been heated to temperature of 1300° F., to an isothermal reactor. In the reactor inlet it was brought into contact with a stream of 19 grams of hydrogen, the ratio of hydrogen to hydrocarbon at the inlet being 15:1. The pressure in the reactor was brought to 1300 p.s.i.g. and the hydrogen was contacted with the biphenyl in a single pass. The residence time of the two reactants was 25 seconds at the pressure and temperature specified for the single pass. The total charge to the reactor was thus 119 grams. The effluent from the reactor contained 6 grams of biphenyl which had not been converted, 17 grams of unreacted hydrogen, 17 grams of lower $C_1$-$C_7$ hydrocarbons which are separated out as by-product and 93 grams of benzene. The total recovery was thus 123 grams of material issuing from the reactor.

Under these conditions the conversion of reactants into benzene was 94 weight percent and the selectivity of the conversion into benzene was 98 weight percent for benzene over other possible petrochemicals. After cooling, unreacted hydrogen and heavy off gas were separated. The partially purified product was led to a distillation column where 90.7 percent by weight of pure benzene was distilled off at 180° F. and when analyzed is seen to exhibit a refractive index of 1.5011. The bottoms boiling above 180° F. (9.3%) was analyzed by high mass spectrometry and found to be about 90% biphenyl and about 10% terphenyl, plus a trace of residual benzene.

*Example 2*

A mixture of 19 percent, by weight, of biphenyl in benzene was fed into an isothermal reactor of the type depicted in the flow sheet and of conventional design. Hydrogen was also introduced into the isothermal reactor 5, which was operated at temperatures ranging from 1200–1350° F., under a pressure of 600 p.s.i.g. The ratio of hydrogen to biphenyl as measured at the inlet to the reactor was 10 to 1 on a molar basis. The reactants were brought into contact in the reactor in a single pass over a period of about 15–25 seconds residence time. After the conversion is completed, the products formed in the reaction were removed from the reactor and passed to a liquid-gas separator for removal and recycle of the unreacted hydrogen. The minor amounts of by-products were separated off in a second liquid gas separator and the benzene pulled off in the distillation tower 20, which separates it from the small quantity of unreacted biphenyl. The latter is recycled to pass again through the system if desired or merely cycled to storage if desired.

*Example 3*

The run depicted in Example 1 was repeated employing an isothermal type reactor in a continuous once-through operation (no recycle). The conditions were those of Example 1. The results of such treatment at the end of two on-stream periods were briefly as indicated in the following tabulation:

|  | Run A | Run B |
| --- | --- | --- |
| Time on Stream (Hrs.) | 18 | 25 |
| Grams Biphenyl In | 100 | 100 |
| Grams Hydrogen In | 19 | 20 |
| Grams Biphenyl Out | 5 | 5 |
| Grams Benzene Out | 87 | 89 |
| Grams Hydrogen Out | 17 | 18 |
| Grams $C_1$-$C_3$ Hydrocarbons out | 1 | 1 |
| Conversion of Biphenyl (Wt. percent) | 95 | 95 |
| Selectivity For Benzene (percent) | 90 | 93 |

Although the ratios of polyphenyl and hydrogen may vary somewhat, it is preferred that the mole ratio of hydrogen to biphenyl be about 15:1. Other ratios are also operable and in some instances lead to equally good yields of benzene. For instance, when the feed to the reactor is a mixture of biphenyl in a benzene solvent the mole ratio of hydrogen to hydrocarbon drops to 10:1 and yet is found to give a good yield of final product. As a general rule, a ratio ranging from 2 moles of hydrogen to 1 mole of hydrocarbon to 30 moles of hydrogen to 1 mole of hydrocarbon can be employed. For practical purposes, however, a ratio of from about 5 to 20 moles of hydrogen to 1 mole of polyphenyl has been found preferable.

The term hydrogenolysis, as it is employed herein, is intended to have its conventional meaning and refers to the conversion of a hydrocarbon in the presence of hydrogen to effect cleavage of carbon-carbon bonds with the simultaneous addition of hydrogen to the fragments thus formed. The terms "polyphenyl" and "polyphenyls" as they are employed herein are intended to embrace biphenyl and, of course, any other more complex phenyl compounds such as terphenyl and their hydrocarbon derivatives, the suffix "poly" being intended to refer to more than one phenyl structure in the molecule.

Although the present invention has been described with preferred embodiments, it will be understood that modifications and variations may be resorted to, without departing from the spirit and scope of this invention, as those skilled in the art will readily understand. Such variations and modifications are considered to be within the purview and scope of the appended claims.

What is claimed is:

1. A non-catalytic process for converting polyphenyls into benzene, which comprises charging said polyphenyl and hydrogen to a pressurized reaction zone, at a temperature between about 1000° F. and about 1400° F., at a pressure of between about 100 p.s.i.g. and about 2000 p.s.i.g., at a residence time of between about 5 seconds and about 50 seconds, and using a hydrogen to hydrocarbon molar ratio of between about 2 and about 30.

2. A non-catalytic process for converting biphenyl into benzene, which comprises charging said biphenyl and hydrogen to a pressurized reaction zone, at a temperature between about 1000° F. and about 1400° F., at a pressure of between about 100 p.s.i.g. and about 2000 p.s.i.g., at a residence time of between about 5 seconds and about 50 seconds, and using a hydrogen to hydrocarbon molar ratio of between about 2 and about 30.

3. A non-catalytic process for converting biphenyl into benzene, which comprises charging said biphenyl and hydrogen to a pressurized reaction zone, at a temperature between about 1200° F. and about 1400° F., at a pressure of between about 300 p.s.i.g. and about 800 p.s.i.g., at a residence time of between about 10 seconds and about 30 seconds, and using a hydrogen to hydrocarbon molar ratio of between about 5 and about 20.

References Cited by the Examiner

Sachanen: "Conversion of Petroleum," 2nd Edition, page 105, published by Reinhold Publ. Co. (1948).

ALPHONSO D. SULLIVAN, *Primary Examiner.*